(12) United States Patent
Askins

(10) Patent No.: US 8,335,405 B2
(45) Date of Patent: Dec. 18, 2012

(54) METHOD AND APPARATUS FOR MEASURING FIBER TWIST BY POLARIZATION TRACKING

(75) Inventor: Charles G Askins, Upper Marlboro, MD (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 308 days.

(21) Appl. No.: 12/614,309

(22) Filed: Nov. 6, 2009

(65) Prior Publication Data

US 2010/0158433 A1    Jun. 24, 2010

Related U.S. Application Data

(60) Provisional application No. 61/112,227, filed on Nov. 7, 2008.

(51) Int. Cl.
*G02B 6/00* (2006.01)
*G02B 6/34* (2006.01)
*G01J 3/28* (2006.01)
*G01J 4/00* (2006.01)

(52) U.S. Cl. .............. 385/12; 385/13; 385/37; 356/326; 356/365

(58) Field of Classification Search .................. 385/12, 385/13, 37; 356/326, 365
See application file for complete search history.

(56) References Cited

U.S. PATENT DOCUMENTS

| | | | |
|---|---|---|---|
| 2006/0013534 A1* | 1/2006 | Bohnert et al. | 385/37 |
| 2007/0297712 A1* | 12/2007 | Meneghini et al. | 385/13 |
| 2008/0285909 A1* | 11/2008 | Younge et al. | 385/13 |

* cited by examiner

*Primary Examiner* — Jerry Blevins
(74) *Attorney, Agent, or Firm* — Amy Ressing; Suresh Koshy

(57) ABSTRACT

An apparatus and accompanying method to measure fiber twist. The method includes independent determination of fiber bending by measuring strain sensing in outer cores of the same fiber. The apparatus includes a multi-core optical fiber comprising a center core and a plurality of peripheral cores at a distance radially from the center core and running parallel to the center core. The center core includes at least one fiber Bragg grating with polarization-dependent reflectivity. The fiber Bragg grating reflects the launched light as reflected light. The apparatus includes a multi-core optical fiber bend sensing system operable to communicate with the multi-core optical fiber. The multi-core optical fiber bend sensing system is operable to sense a bend in the multi-core optical fiber. The apparatus includes a processor operable to communicate with the polarization controller. The apparatus includes a polarization vector analyzer operable to communicate electronically with the processor, and optically with a portion of the light launched into the central core of the optical fiber. The polarization vector analyzer is operable to measure the state of polarization of the launched light. The polarization controller is operable to align the polarization of the launched light with the minor axis or the major axis of birefringence of the FBG. The processor is operable, after the polarization controller aligns the polarization of the launched light, to determine a twist in the multi-core optical fiber based on the polarization of the launched light and the bend in the multi-core optical fiber.

9 Claims, 6 Drawing Sheets

METHOD AND APPARATUS FOR MEASURING FIBER TWIST BY POLARIZATION TRACKING

CROSS-REFERENCE TO RELATED APPLICATION

This application claims priority to U.S. Provisional Patent Application Ser. No. 61/112,227, filed Nov. 7, 2008, entitled "MEASUREMENT OF FIBER TWIST BY POLARIZATION TRACKING," to Askins.

FIELD OF THE INVENTION

The present invention relates in general to a method and apparatus for measuring twist in an optical fiber which may concurrently experience bending, and more particularly to a method and apparatus for measuring twist by tracking polarization of light in the optical fiber.

BACKGROUND OF THE INVENTION

For a range of applications, it is useful to deduce the shape that a flexible optical fiber occupies in space using only measurements of light traveling within the fiber; this shape generally includes both bending and twisting deflections. Traditional shape estimation failed to address torsion. Such a failure is permissible in a torsionally rigid optical fiber, wherein bend states of direction and curvature fully and accurately describe the three-dimensional geometry of the optical fiber. However, torsional deflection of the optical fiber can make for entirely different geometries as compared to the geometry of a torsionally rigid optical fiber.

As shown in FIG. 1, a prior art method and apparatus 10 use fiber Bragg gratings 20 ("FBGs") in a multi-core optical fiber 30 having multiple cores and a helical bias of some peripheral cores. See, e.g., C. G. Askins, et al., Proc. Bragg Gratings, Photosensitivity and Poling in Glass Waveguides 2007, JWA39, Quebec Canada, incorporated herein by reference, and C. G. Askins et al., OFC/NFOEC 2008 Tech. Digest, OMT3, San Diego Calif. ("Askins OFC 2008"), incorporated herein by reference. In that approach, local uniaxial strains sensed by the variously placed and oriented FBGs are used to deduce both bending and twisting. The prior art apparatus 10 includes a polarization controller 40, a charge-coupled device ("CCD") spectrometer 50, a processor 60, and a broadband light source 70. The polarization controller 40 is computer-driven, and is capable of outputting any state of polarization ("SOP") from any input SOP. The spectrometer 50 permits high-speed determination of the center wavelength of light reflected from the multiple FBGs. The processor 60 adjusts the controller in response to the wavelength measured by the spectrometer 50.

In addition to the physical bases of that approach, polarization-dependent reflectivity ("PDR") is another optical effect in optical fibers bearing Bragg gratings which may be exploited. With PDR, the spectrum of light reflected by a FBG is seen to shift in wavelength depending on the SOP of the light illuminating it. In particular, when light is linearly polarized and aligned with the "slow" PDR axis, the longest Bragg reflection wavelength is observed; light polarized normal to this direction produces the shortest Bragg reflection wavelength ("Bragg wavelength" is used as shorthand for the midpoint or centroid of a FBG reflection spectrum having finite width). FIG. 2 shows an experimental graph of PDR, where two distinct reflection spectra are seen from the same FBG illuminated with orthogonal polarizations. PDR results both from intrinsic fiber birefringence and from the grating inscription process; the orientation of the two birefringence components may not necessarily align. The rotational orientation of the net birefringence is fixed with respect to the fiber, and is nearly unperturbed by significant bending or twisting for gratings in cores at the centerline of the fiber. While large lateral stresses can disturb PDR orientation and magnitude, such stresses may be avoided in many applications of interest.

According to this prior art method, a fiber-squeezing polarization scrambler is used to vary the SOP of light illuminating the FBG. Alternatively, any of several designs of polarization controller using various means of optical phase modulation (e.g., electro-optic modulation and adjustable bulk optics), are also capable of this function. The initial purpose of the scrambler is to rapidly vary the SOP to remove polarization sensitivity. However, an alternative to polarization scrambling is systematic modulation of SOP in response to rapid measurements of Bragg wavelength to permit tracking of the maximum (or minimum) PDR wavelength. The signals are monitored by CCD spectrometer to obtain a real-time feedback signal to adjust the force on three fiber-squeezing actuators, constituting an electro-mechanical polarization controller. Representative shifts in measured wavelength (vertical axis) are plotted versus time (horizontal axis) in FIG. 3. The signal represents how the measured Bragg wavelength is seen to vary as a representative sampling of all possible states of polarization (SOP) sequentially illuminate the FBG by use of a rapidly adjustable polarization controller. For the example, the strain state of the FBG is not varied during the measurement interval. The graph shows the smoothly-evolving nature of the signal, and its suitability for an algorithm which automatically "tracks" the maximum or minimum Bragg wavelength by applying adjustments to the polarization controller. Dashed line "A" is the maximum measured Bragg wavelength for a constant strain state: this occurs when light is linearly polarized and aligned with the slow birefringent axis at the location of the fiber Bragg grating (FBG). Dashed line "B" is the minimum measured Bragg wavelength: this occurs when light is linearly polarized and aligned with the fast birefringent axis at the location of the fiber Bragg grating (FBG).

Polarization controllers are commonly available and apply birefringence to an optical path (which may constitute, or be connected to, an optical fiber) and monitor the resulting SOP with a polarization analyzer. By way of example, Applicant's polarization tracking algorithm is described as follows. The polarization control is modified in response to a spectral measurement and finds and tracks maxima or minima of Bragg wavelengths, thereby maintaining polarization alignment with the FBG. Light from a broadband source is guided by a single-moded optical fiber which is subjected to lateral compression by three or more actuators. Each actuator modulates a compressive force along a direction perpendicular to the fiber's axis, and substantially differing from each of the other actuators. Each actuator is capable of applying sufficient stress to produce birefringence exceeding a full wave of phase difference. This configuration is sufficient to convert any input SOP to any other. The measured Bragg wavelength of an FBG is recorded as all squeezers are rapidly modulated. When the largest observed Bragg wavelength is identified, the squeezer drive signals are noted. From this point forward, the squeezers are only "dithered" over a reduced range and the Bragg wavelength monitored to guide small, frequent offsets to the average setting of each squeezer. Occasionally, the end of the adjustment range of a squeezer is approached, and a large step adjustment corresponding to a one-wave phase shift is applied toward the center of the squeezer's operational range. In the example, fiber squeezers are used to produce adjustable birefringence. Alternatively, electro-optic modulators, bulk optical elements, or other suitable phase modulation devices may be used for the same purpose. Examples of suitable commercial products include Adaptif model A3000 and Thorlabs model IPM5300.

Although the FBG is not disturbed (i.e., no changes in temperature or strain), when the birefringence-inducing fiber squeezers are modulated, the indicated strain also modulates. The computer or processor rapidly executes the above-mentioned algorithm to adjust fiber squeezer drive signals to converge on the maximum (or minimum) PDR wavelength, which amounts to establishing linearly polarized light aligned with the "slow" (or fast) PDR axis of the FBG. As a new strain state occurs in the fiber due to incremental bending or twisting, the algorithm is applied to re-establish polarization alignment with the FBG.

BRIEF SUMMARY OF THE INVENTION

An embodiment of the invention includes an apparatus comprising a polarization controller operable to adjust polarization of launched light. The apparatus includes a multi-core optical fiber comprising a center core and a plurality of peripheral cores at a distance radially from the center core and running parallel to the center core, the center core comprising at least one fiber Bragg grating (FBG) with polarization-dependent reflectivity, the FBG at a specified distance from the launch end of the fiber, the multi-core optical fiber being operably located to receive the launched light, the fiber Bragg grating reflecting the launched light as reflected light. The apparatus includes a multi-core optical fiber bend sensing system operable to communicate with the multi-core optical fiber, the multi-core optical fiber bend sensing system being operable to measure curvature in the multi-core optical fiber. The apparatus includes a processor operable to communicate with the polarization controller. The apparatus includes a polarization vector analyzer operable to communicate with the multi-core optical fiber and the processor, the polarization vector analyzer being operable to measure the polarization state of the launched light. The FBG exhibits a minor axis and a major axis of birefringence. The polarization controller is operable to vary the polarization of the launched light so that light arriving at the FBG is linearly polarized and aligned with one of the minor axis and the major axis of birefringence. The processor is operable, after the polarization controller adjusts the polarization of the launched light, to determine a twist in the multi-core optical fiber based on the polarization of the launched light and the bend in the multi-core optical fiber, and the specified distance from the launch end of the fiber to the FBG.

Optionally, the apparatus includes a single core optical fiber; an optical fiber coupler; and a light source communicating with said single core optical fiber and operable to transmit said launched light through said single core optical fiber thence through said optical fiber coupler and into the multi-core optical fiber. The apparatus includes a spectrometer communicating with the single core optical fiber and the processor. The apparatus includes a beam splitter with fiber-coupling optics communicating with the single core optical fiber, the polarization vector analyzer, and the multi-core optical fiber. The apparatus includes one of a switch and a fan-out operably communicating with the beam splitter and the multi-core optical fiber.

Optionally, the polarization controller comprises one of an electro-optical polarization controller, a bulk-optic polarization controller, and an electro-mechanical polarization controller, the electro-mechanical polarization controller comprising a plurality of fiber squeezers.

Optionally, the at least one fiber Bragg grating comprises a plurality of fiber Bragg gratings.

Optionally, the multi-core optical fiber bend sensing system is operable to determine the bend from strain sensed in the plurality of peripheral cores.

Optionally, the light source comprises one of a tunable narrowband light source and a broadband light source communicating with a tunable narrowband filter.

Optionally, the apparatus further includes a polarization-maintaining single-mode and single core optical fiber communicating with said polarization controller. The apparatus includes a narrowband light source comprising a narrowband light source wavelength; a broadband light source; a first polarization-maintaining coupler communicating with the polarization-maintaining single-mode optical fiber; a second polarization-maintaining coupler communicating with the polarization-maintaining single-mode optical fiber; a first linear polarizer communicating with the narrowband light source and the first polarization-maintaining coupler; and a second linear polarizer communicating with said broadband light source and said second polarization-maintaining coupler. The apparatus includes a spectrometer communicating with the single core optical fiber through the second polarization maintaining coupler and the processor. The apparatus includes a beam splitter with fiber-coupling optics communicating with said polarization-maintaining single core optical fiber, said polarization vector analyzer, and said multi-core optical fiber. The apparatus includes one of a switch and a fan-out operably communicating with said beam splitter and said multi-core optical fiber. The apparatus includes a narrowband filter communicating with the beam splitter and the polarization vector analyzer, the narrowband filter having a pass band wavelength coincident with the narrowband light source wavelength, the pass band wavelength being distinct from any Bragg wavelength of the FBG. This arrangement allows low noise monitoring of the SOP of the narrow-band light source. Further, by computation (based on known birefringence changes in the polarization controller and scaling by wavelength), the SOP of all other wavelengths launched into the multi-core optical fiber may be known simultaneously and without the complication of stray light reflected from the polarization analyzer at wavelengths associated with the FBGs.

Optionally, the narrowband light source comprises a laser diode.

An alternative embodiment of the invention includes a method of measuring fiber twist in a multi-core optical fiber comprising a center core and a plurality of peripheral cores at a distance radially from said center core and running parallel to said center core, said center core comprising at least one fiber Bragg grating with polarization-dependent reflectivity at a specified distance from a launch end of the multi-core fiber, said multi-core optical fiber being operably located to receive launched light, the launched light comprising a state of polarization and a polarization axis, the fiber Bragg grating comprising a fast birefringent axis and a slow birefringent axis. The method comprises the following steps or operations. Intrinsic fiber birefringence in the center core and birefringence produced in the center core by bending and twisting are calibrated. The SOP of the launched light is adjusted until the launched light reaching the FBG is linearly polarized thereby having a polarization axis, and the polarization axis of the launched light at the FBG is aligned with the slow birefringent axis of the FBG. The state of polarization of the launched light is measured when a maximum polarization-dependent reflectivity wavelength of the FBG is detected. A local bending of the multi-core optical fiber is determined based on strain sensed in the plurality of peripheral cores. A bend-induced birefringence produced by the determined bending of the multi-core optical fiber is calculated. An SOP at the FBG is calculated based on the SOP of the launched light, which evolves over the specified distance in a manner determined by birefringence produced by the determined local bending, the calibrated intrinsic fiber birefringence, and a candidate level of fiber twist. The candidate level of fiber twist is adjusted until the calculated SOP at the FBG is linear and aligned with the FBG rotated by the candidate level of fiber twist.

Optionally, the adjusting the SOP of the launched light until the launched light reaching the FBG is linearly polarized thereby having a polarization axis, and the polarization axis of the launched light at the FBG is aligned with the slow birefringent axis of the FBG operation comprises: detecting, using the spectrometer, a maximum instantaneous polarization-dependent reflectivity wavelength.

Optionally, the adjusting the SOP of the launched light until the launched light reaching the FBG is linearly polarized thereby having a polarization axis, and the polarization axis of the launched light at the FBG is aligned with the slow birefringent axis of the FBG operation comprises: launching the launched light from a light source that emits the launched light over a spectral range that includes a Bragg wavelength of the reflected light reflected by the at least one fiber Bragg grating; measuring the Bragg wavelength of the reflected light; and varying the state of polarization of the launched light until the maximum instantaneous polarization-dependent reflectivity wavelength is detected.

Optionally, adjusting the candidate level of fiber twist until the calculated SOP at the FBG is linear and aligned with the FBG rotated by the candidate level of fiber twist operation comprises: assigning an error figure-of-merit for how well the candidate level of fiber twist corresponds to a linear state of polarization, which is aligned with the fiber Bragg grating rotated by the candidate level of fiber twist; adjusting the candidate level of fiber twist and noting an associated error figure-of-merit; repeating said adjusting the candidate level of fiber twist, and noting an error figure-of-merit associated with the adjusted candidate level of fiber twist until a minimum error figure-of-merit is achieved, thereby yielding an estimated fiber twist of the multi-core optical fiber.

A method of measuring fiber twist in a multi-core optical fiber comprising a center core and a plurality of peripheral cores at a distance radially from said center core and running parallel to said center core, said center core comprising at least one fiber Bragg grating with polarization-dependent reflectivity at a specified distance from a launch end of the multi-core fiber, said multi-core optical fiber being operably located to receive launched light, the launched light comprising a state of polarization and a polarization axis, the fiber Bragg grating comprising a fast birefringent axis and a slow birefringent axis. The method comprises the following steps or operations. Intrinsic fiber birefringence in the center core and birefringence produced in the center core by bending and twisting are calibrated. The SOP of the launched light is adjusted until the launched light reaching the FBG is linearly polarized thereby having a polarization axis, and the polarization axis of the launched light at the FBG is aligned with the fast birefringent axis of the FBG. The state of polarization of the launched light is measured when a minimum instantaneous polarization-dependent reflectivity wavelength of the FBG is detected. A local bending of the multi-core optical fiber is determined based on strain sensed in the plurality of peripheral cores. A bend-induced birefringence produced by the determined bending of the multi-core optical fiber is calculated. An SOP at the FBG is calculated based on the SOP of the launched light, which evolves over the specified distance in a manner determined by birefringence produced by the determined local bending, the calibrated intrinsic fiber birefringence, and a candidate level of fiber twist. The candidate level of fiber twist is adjusted until the calculated SOP at the FBG is linear and aligned with the FBG rotated by the candidate level of fiber twist.

Optionally, the adjusting the SOP of the launched light until the launched light reaching the FBG is linearly polarized thereby having a polarization axis, and the polarization axis of the launched light at the FBG is aligned with the fast birefringent axis of the FBG operation comprises: detecting, using the spectrometer, the minimum instantaneous polarization-dependent reflectivity wavelength.

Optionally, the adjusting the SOP of the launched light until the launched light reaching the FBG is linearly polarized thereby having a polarization axis, and the polarization axis of the launched light at the FBG is aligned with the fast birefringent axis of the FBG operation comprises: launching the launched light from a light source that emits the launched light over a spectral range that includes a Bragg wavelength of the reflected light reflected by the at least one fiber Bragg grating; measuring the Bragg wavelength of the reflected light; and varying the state of polarization of the launched light until the maximum instantaneous polarization-dependent reflectivity wavelength is detected. Optionally, the adjusting the candidate level of fiber twist until the calculated SOP at the FBG is linear and aligned with the FBG rotated by the candidate level of fiber twist operation comprises: assigning an error figure-of-merit for how well the candidate level of fiber twist corresponds to a linear state of polarization, which is aligned with the fiber Bragg grating rotated by the candidate level of fiber twist; adjusting the candidate level of fiber twist and noting an associated error figure-of-merit; repeating said adjusting the candidate level of fiber twist, and noting an error figure-of-merit associated with the adjusted candidate level of fiber twist until a minimum error figure-of-merit is achieved, thereby yielding an estimated fiber twist of the multi-core optical fiber. Optionally, at least one fiber Bragg grating comprises a plurality of successive fiber Bragg gratings, the method further comprising sequentially estimating a fiber twist segment between successive fiber Bragg gratings of the plurality of fiber Bragg gratings to yield a twist geometry of the multi-core optical fiber.

DETAILED DESCRIPTION OF THE INVENTION

Figure 1:
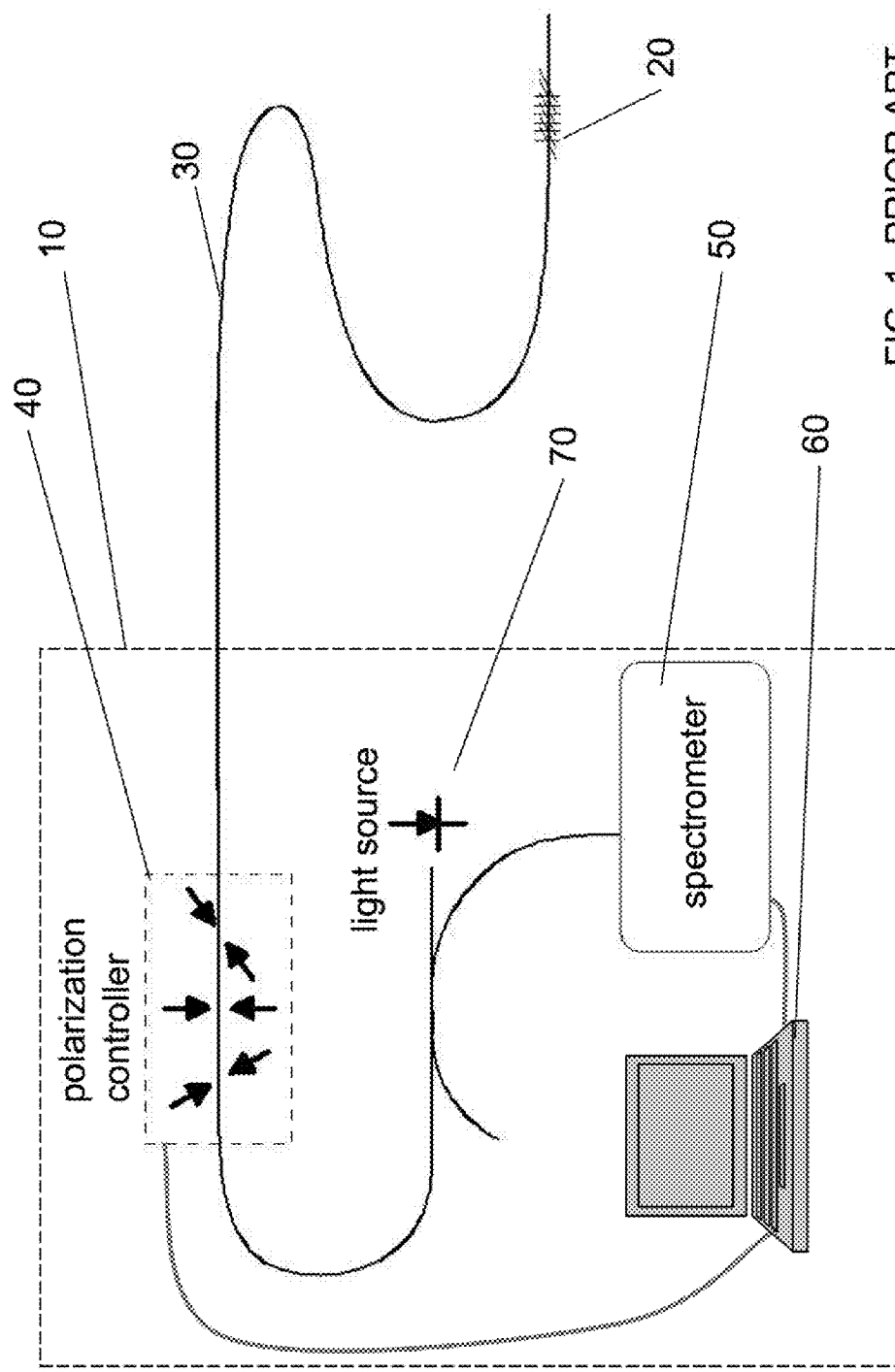
FIG. 1 is a graph of illustrative spectra showing PDR in a FBG.
Figure 2:
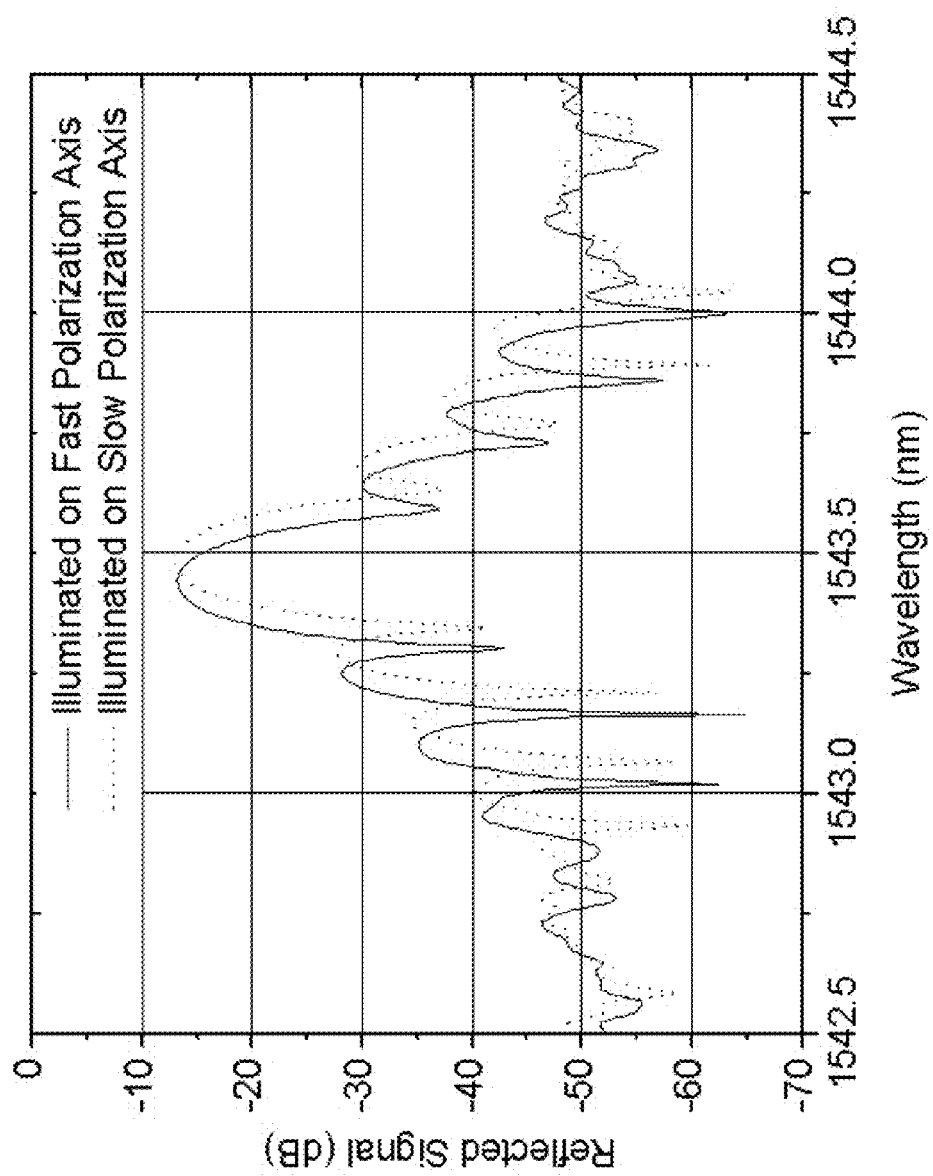
FIG. 2 is a schematic illustration of a prior art apparatus for tracking PDR alignment in a FBG.
Figure 3:
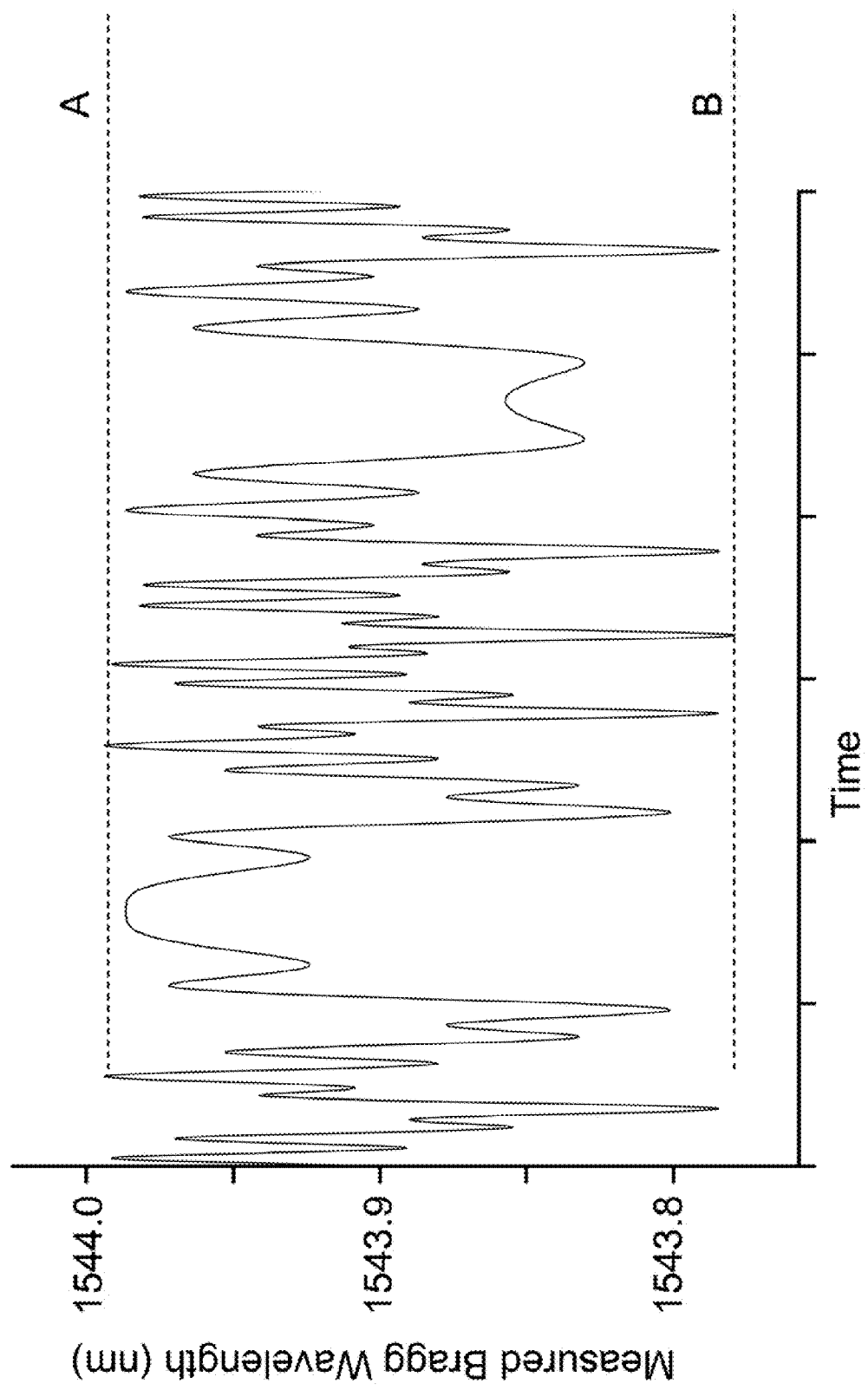
FIG. 3 is a graph of illustrative data showing variation in the Bragg reflected wavelength as the SOP is modified by a polarization controller.

The basis for sensing twist in a fiber with the inventive apparatus and method may be conveyed by a thought experiment. Consider any of several optical elements which exhibit reflectivity which is dependent upon the polarization of the light illuminating their surfaces. Determination of the optic's rotational orientation (with 180-degree degeneracy) is readily obtained by measuring the reflected intensity of a linearly polarized, probing light beam as the light's polarization axis is systematically swept through 360 degrees. Determining the orientation of a FBG with PDR is an extension of this principle. In this case, the probing light travels along an optical path which modifies the SOP of propagating light in the presence of bending and twisting according to well understood physical laws. Further, a fiber Bragg grating may exhibit a sharp dependence of reflectivity on wavelength.

An embodiment of the invention includes a method comprising the following steps or operations.

Operation A involves calibrating fiber birefringence. In Operation A, optical measurements are performed to calibrate how much birefringence is produced by bending and twisting in a multi-core optical fiber. Standard methods for making such measurements are applied.

Operation B involves aligning polarization. In Operation B, the maximum (or minimum) instantaneous Bragg wavelength occurs when light illuminating the FBG is linearly polarized, and when the light's polarization direction aligns with the FBG's slow (or fast) birefringent axis. More specifically, Operation B involves three sub-operations. In Sub-operation B1, launch light is launched from a source which emits light over a spectral range that includes all Bragg wavelengths reflected by a fiber Bragg grating being interrogated and located in a center core of the multi-core optical fiber. In Sub-operation B2, a Bragg wavelength of reflected light is measured. In Sub-operation B3, the SOP of launched light is systematically varied (as opposed to randomly varied) until the instantaneous maximum (or minimum) PDR wavelength is found. Standard apparatuses for varying SOP in optical fibers are used.

Operation C involves measuring the SOP of the launched light which produces the maximum (or minimum) PDR Bragg wavelength, to be referred herein as the SOP at Maximum (or Minimum) PDR Wavelength ("SMPW"). Standard methods and standard apparatuses to measure SOP are used.

Operation D involves determining local fiber bending. Standard methods to measure the direction and magnitude of bending in a fiber using optical measurements of differential strain in multiple cores displaced from the fiber's central axis are used. Illustrative standard methods use twisted peripheral cores in the multi-core optical fiber or straight peripheral cores in the multi-core optical fiber.

Operation E involves calculating birefringence. The calibration obtained in Operation A is used to calculate the birefringence produced by the known bending between the launch end of the fiber and the FBG.

Operation F involves estimating twist from known quantities. The most probable description of fiber twist which is consistent with the calibrations and measurements is calculated. An iterative illustrative approach is described as follows with the following sub-operations.

In Sub-operation F1, an amount and direction of fiber twist is conjectured and then how the SMPW changes by traveling through the fiber (having known bend shape, and the conjectured twist) to the location of the FBG is calculated. The SOP at the location of the FBG is calculated in the standard manner by representing the SMPW and each length of fiber having known birefringence with Stokes matrices.

In Sub-operation F2, an error figure-of-merit is assigned for how well the estimated SOP from step F1 equals a linear state of polarization at the position of the FBG of interest, and with the polarization axis rotated by the same amount as the conjectured twist. As an example, let error1 equal 1 divided by the ellipticity of the SOP calculated in Sub-operation F1 at the FBG of interest. Linear polarization gives a error1 value of zero. Let error2 equal the angle in radians between the major axis of the SOP from F1 and the conjectured twist angle. The error figure-of-merit is, in this example, expressed as the sum of error1 and error2.

In Sub-operation F3, the conjectured fiber twist is adjusted within a range constrained by the physical bounds of the application and guided by trends of results from previous conjectures while noting the associated error figure-of-merit.

In Sub-operation F4, Sub-operations F1, F2 and F3 are repeated to minimize the error figure-of-merit; and the conjectured twist with the minimum error figure-of-merit is taken as the estimate of twist.

In practice, the above-described operations are performed initially on a straight and relaxed fiber to provide a baseline set of optical measurements. Variations from the baseline measurements are then unambiguously attributed to the presence of bending and twisting. In concept, several discrete values for twist can transform a given SMPW to the same SOP at the FBG, in the same manner that a multiple order waveplate can produce the same transmitted SOP as a "zeroth order" waveplate. However, in practice, the magnitude of the twist-induced birefringence is quite small for reasonably expected values of twist. Therefore, the lowest twist-induced birefringence, which is consistent with the other measurements, is the correctly assumed value.

Figure 4:
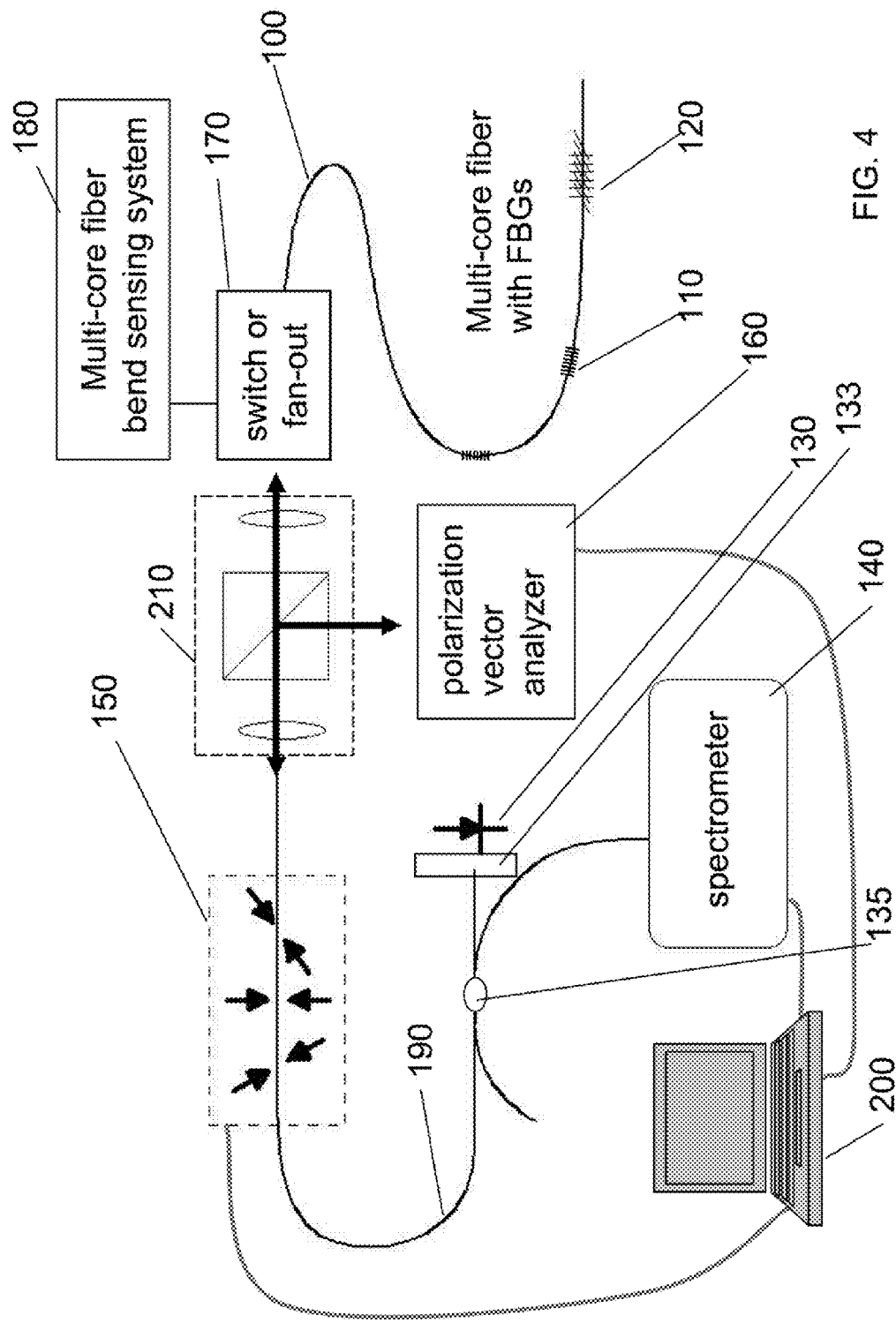
FIG. 4 is a schematic illustration of an embodiment of the inventive apparatus to measure twist and bending in a multi-core optical fiber by tracking PDR axes of FBGs in the center core.
Figure 6:
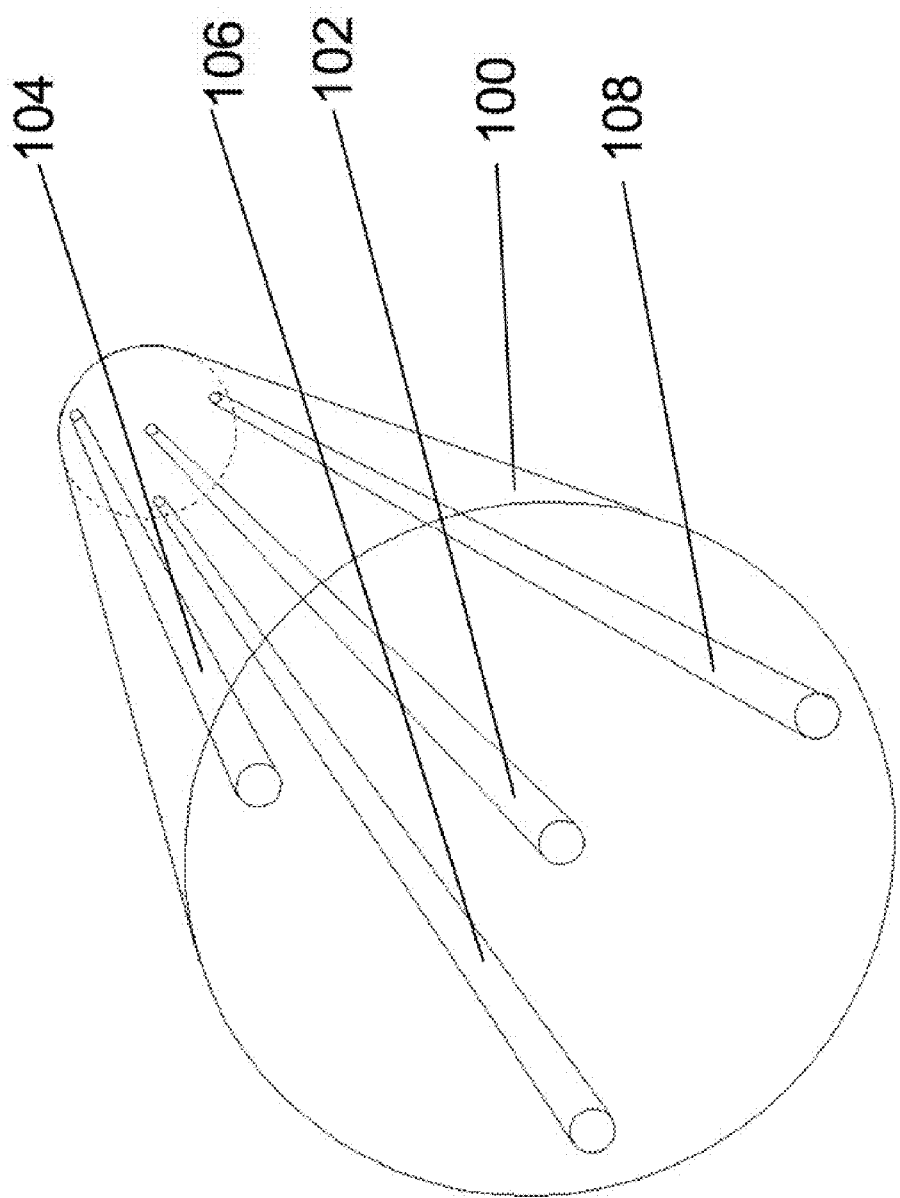
FIG. 6 is an illustrative multi-core optical fiber for use with the instant invention.

Referring to FIGS. 4 and 6, apparatus embodiments of the invention are described as follows. Multi-core optical fiber 100, the twist (or torsion) of which is to be measured, has a light-guiding center core 102 placed essentially at the fiber's centerline, and at least one (though preferably multiple) FBG reflectors 110, 120 spaced along its length. Additional, parallel cores 104, 106, 108 positioned near the multi-core optical fiber's outside diameter are provided with similar FBGs to quantify bending deflections.

The polarization of the reflected light is determined by a standard polarization vector analyzer 160. The polarization of the reflected light is compared with the polarization of the launched light by using a standard spectrometer 140 to determine the Bragg wavelength of the light reflected from the FBG being studied. The computer-controlled polarization controller squeezes the single core optical fiber 190 to adjust the polarization of the launched light toward the polarization of the reflected light. When the polarization of the launched light is adjusted to the longest (or shortest) Bragg wavelength is reflected from the FBG, the launched light is known to be linearly polarized and in alignment with a fast (or slow) PDR axis at the location of the grating. The SOP is not likely to be the same at the launch end and at the FBG; rather, SOP evolves smoothly along the intervening path. Transformation of SOP along the fiber occurs deterministically in response to intrinsic birefringence, geometrical phase (i.e., path shape), bend- and twist-induced stress optical birefringence, and grating-inscription birefringence. Intrinsic birefringence is a stable property that can be calibrated for each sample, and inscription birefringence is directly measurable. Length-dependent evolution of SOP amounts to accumulated phase differences in light propagating with different polarizations; the effects of shape-induced waveguide perturbations on optical paths are well-described in the prior art literature. See, e.g., Ulrich et al., "Bend-Induced Birefringence in Single-Mode Fibers, OPTICS LETTERS, Vol. 5, No. 6, June 2008, p. 273-275, incorporated herein by reference, and H. C. LeFevre, "Single-mode Fibre Fractional Wave Devices and Polarization Controllers," ELECTRONICS LETTERS, Vol. 16, No. 20, 25 Sep. 1980, pp 778-780, incorporated herein by reference. Precise elasto-optical coefficients of particular fibers may be obtained by calibration, and applied to the independent measurements of bending.

A short segment of well-characterized fiber is assumed, over which twist is posited to be constant, and simple bending is independently resolved. Starting from the measured SOP of light at the launch end, a most-probable combination of known bending and (a single unknown value of) twist will cause the light to reach the FBG in a linear, aligned state. Multiple, consistent solutions for twist may be found by convergent iteration, and further selected in order of least deflection. The approach need not initially consider twist-induced birefringence, because the actual effect is quite small for moderate rates of twist. Further, the first estimate of twist may then be used to reduce error in subsequent iterations which include twist-induced birefringence.

FIG. 4 shows the optical components needed for twist monitoring: the tested multi-core optical fiber 100 with FBGs 110, 120, a broadband light source 130, an instrument for measuring the Bragg wavelength from light reflected by FBG's 140 (or other instrument) for providing real-time measurements of the reflected Bragg wavelength, and a standard computer-controlled polarization controller 150, a standard polarization vector analyzer 160, a single core optical fiber 190, a processor 200, and a non-polarizing beam splitter with fiber coupling optics 210. The wavelength measuring device 140 is any device capable of measuring the wavelength of light reflected by an FBG with an accuracy of a few picometers, and capable of measuring changes in Bragg wavelength as small as about 0.1 picometers, and which changes occur within less than one second. Preferably, wavelength measuring device 140 is for example a fiber-coupled CCD spectrometer (e.g., the spectrometer disclosed in U.S. Pat. No. 6,233,373 to Askins, incorporated herein by reference) or a scanning Mach-Zehnder interferometer (e.g., the interferometer disclosed in Flockhart et al., "Differential phase tracking applied to Bragg gratings in multicore fiber for high accuracy curvature measurement," Smart Structures and Materials 2006: Smart Sensor Monitoring Systems and Applications, Proc. of SPIE Vol. 6167, 616701, (2006), incorporated herein by reference). The fiber-coupled CCD spectrometer provides high detection sensitivity and parallel measurement of many FBGs simultaneously, and can be further expanded to address many more FBGs by the inclusion of time-division multiplexing as described in U.S. Pat. No. 6,233,373 to Askins. The Mach-Zehnder interferometer provides very high speed and very high wavelength resolution for a single FBG at a time, or for several FBGs at one time by the inclusion of wavelength multiplexing optics, or by the inclusion of time division multiplexing.

Examples of illustrative polarization controllers are found in U.S. Pat. No. 6,480,637 to Yao and U.S. Pat. No. 4,389,090 to LeFevre, both incorporated herein by reference. Examples of illustrative polarization vector analyzers 160 are Adaptif model A1000 and Thorlabs model series PAX 5000.

In addition, optics 170 for achieving multiple-core fan-out (e.g., [ ]) or an optical switch allows connection of interrogation instruments 180 to evaluate bending by calculation from strain sensed in the outer cores of the fiber. An example of a high speed switch for selectively coupling multiple cores of an arbitrary geometry multicore fiber to optical instrumentation is reported in C. G. Askins, Presentation MM3, Proceedings of the 21st Annual Meeting of the Lasers and Electro-Optical Society, Newport Beach, Calif., 9-13 Nov. 2008, incorporated herein by reference and Askins OFC 2008. An example of a bend-sensing system 180 is found in G. M. H. Flockhart el al, Opt. Lett. Vol. 28, 387-389 (2003), incorporated herein by reference.

Optionally, an embodiment of the inventive method includes a tunable narrow-band filter 133 inserted between the broadband light source 130 and the coupler 135, as shown in FIG. 4. An example of a suitable tunable narrow-band filter 133 is a tunable Fiber Fabry-Perot filter made by Micron Optics. The bandwidth of the tunable filter 133 is wider than the spectral width of the FBG of interest so that the polarization analyzer 140 may unambiguously evaluate the SOP of the light which illuminates the FBG of interest.

Figure 5:
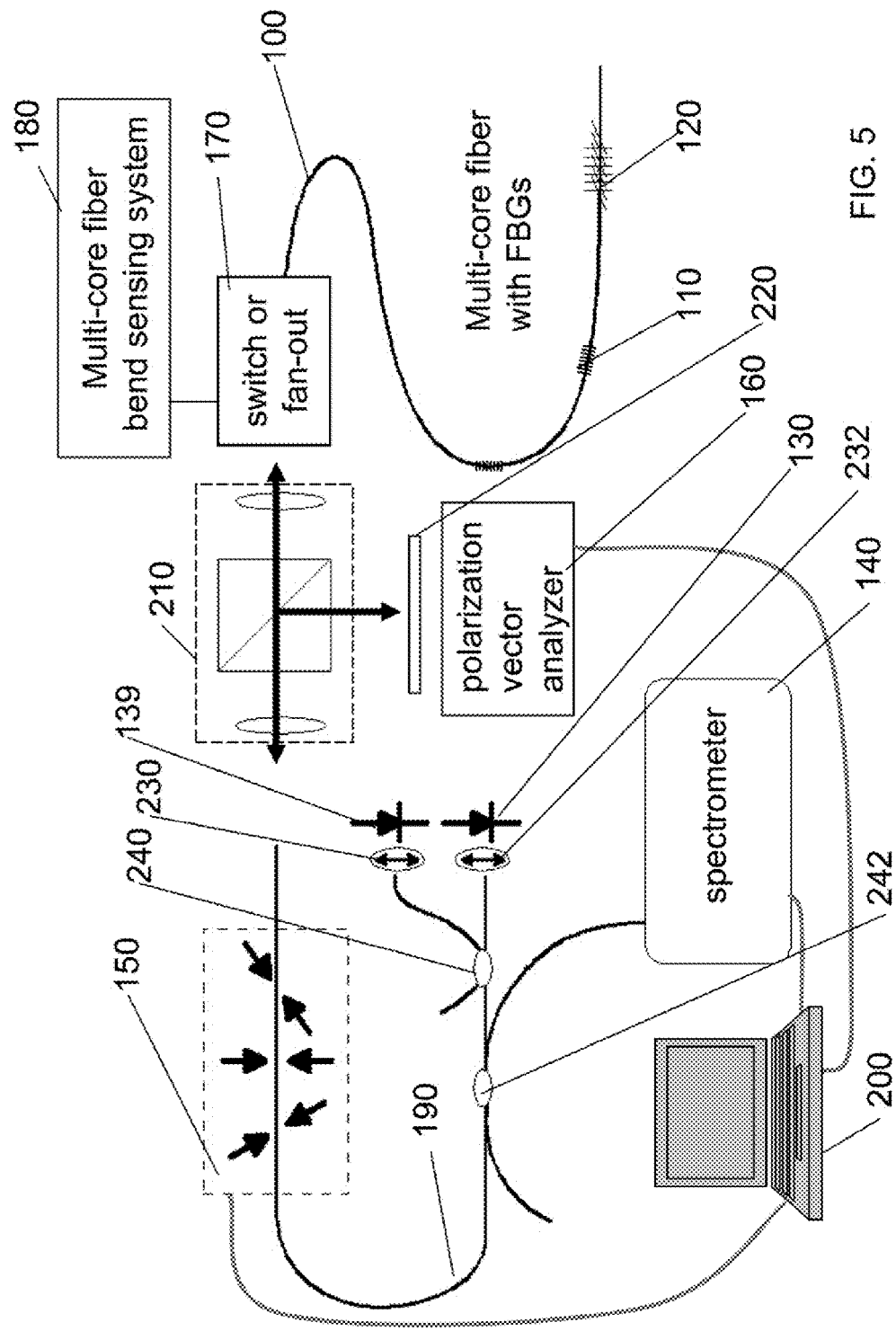
FIG. 5 is a schematic illustration of another embodiment of the inventive apparatus to measure twist and bending in a multi-core optical fiber by tracking PDR axes of FBGs in the center core.

An alternative embodiment of the inventive apparatus is shown in FIG. 5. A narrow-band filter 220 inserted between the beamsplitter 210 and the polarization vector analyzer 160 so that the SOP of only a narrow portion (preferably less than 1 nm) is measured by the analyzer 160. Optionally, the wavelength passed by the narrow-band filter 220 is within the wavelength range emitted by the light source, but not equal to any Bragg wavelength of the various FBGs so as to avoid reflected light from the polarization analyzer interfering with the light from any of the various FBGs. For a stable arrangement of components 150, 210, 220 and 170, and a known SOP of light at each wavelength entering the polarization controller 150, the SOP of each small wavelength interval launched into the multi-core optical fiber 100 through the beamsplitter 210 is determined relative to the SOP of all other wavelength intervals. By this observation, knowledge of the SOP of the narrow wavelength band transmitted by the tunable narrow-band filter 220 to the polarization analyzer 160 enables calculation of the SOP of the light which illuminates any FBG of known Bragg wavelength after launch through the fanout or fiber switch 170. The SOP of light illuminating all FBGs may then be determined simultaneously without reconfiguring any optical elements. Optionally, a high-brightness narrow bandwidth light source 139 (preferably a laser diode) with a wavelength matching the transmission pass band of the narrow-band filter 220 is coupled with the broadband light source 130 by polarization-maintaining coupler 240. Optionally, the single-core optical fiber 190 and polarization-maintaining couplers 240, 242 are made with polarization-maintaining fiber, and linear polarizers 230, 232 assure that light from the light sources 130, 139 are linearly polarized and aligned with a polarization axis of the fiber 190 so that the SOP of all wavelengths entering the polarization controller 190 is equivalent. Optionally, the beamsplitter and accompanying coupling optics constitute bulk, free-space optics because of their highly stable properties with respect to the SOP of transmitted light. Optionally, the beamsplitter and coupling optics constitute planar waveguide optics or fiber-based optics because of their compactness.

Optionally, an embodiment of the inventive method starts with providing the multi-core optical fiber 100 in relaxed state. In the relaxed state, a baseline birefringence map is made for each section of the multi-core optical fiber between successive FBGs in the center core. Once the baseline map is generated, then when the multi-core optical fiber 100 takes on a new geometry, relative changes to the baseline map can be determined. Those relative changes or departures from the baseline map are attributable to bending and twist geometries of the multi-core optical fiber 100.

The method and apparatus are most successful when applied successively to short segments of fiber subjected to slowly varying (along the fiber's length and in time) levels of bend and twist that vary slowly in time and along the fiber's length. Such slowly varying conditions are typical for many applications where fiber shape must be evaluated. For the purpose of this discussion, slowly varying bend and twist in length means that that the shape is effectively static during the time required to apply the polarization tracking method. That is, bend and twist along the fiber's length must be sufficiently slowly varying that sufficient sampling of bending stresses is measured to accurately infer bending shape. The time rate of bending and twisting can be increased by commensurately more rapid detection of the described optical signals, and more rapid execution of the described algorithms. More rapid variations along the fiber's length are accommodated by a reduced spacing between successive FBGs along the multi-core fiber's length. By example, a spacing between bend sensing FBGs of less than 10 cm would permit accommodation of curvatures that vary appreciably only at separations greater than 10 cm. Fiber twist changes occurring at a rate of 10 degrees per second would require completion of the polarization tracking algorithm more than 10 times per second. Radii of curvatures greater than 1 cm over 10 cm of fiber length, and twist rates below $2\pi$ radians per meter over 10 cm both produce less than $\frac{1}{4}$ wave birefringence at wavelengths between 500 and 1700 nm, and are therefore readily distinguishable by the instant method. Once twist and bend are solved for the segment of fiber between launch and the first FBG, optical and geometrical conditions at the first FBG is essentially as well known as at the launch location. The method is then repeated with each solved FBG location serving as an equivalent launch location. This permits twist (and shape) estimation through a length of fiber bearing a series of FBGs. Unambiguous measurement of successive FBGs along a single waveguide is accomplished by wavelength-division-multiplexing ("WDM") or time-division-multiplexing ("TDM"), or a combination of both. In the case of WDM, calculation of SOP evolution along a waveguide must consider wavelength-dependent optical path differences. Over small ranges of wavelengths, and for moderate inter-grating fiber lengths, length-dependent phase differences (SOP) may be safely scaled from solutions obtained at nearby wavelengths. This permits concatenation of calculated SOP and fiber geometry using a series of gratings at different wavelengths. Since gradients in twist are not easily supported by a nominally free fiber, adjacent estimates of twist can be screened for consistency, and treated statistically to reduce estimation noise.

In other embodiments of the invention, enhanced PDR would improve the sensitivity of the SOP measurements. Also, the optical effects producing PDR should dominate handling-induced birefringence effects so that the rotational orientation of the PDR is fairly stable. For reference, a $\frac{1}{4}$ wave retardation may be effected in single mode fiber with ~20 cm wound at 30 mm diameter (corresponding to ~$10^{-6}$ birefringence.) Many shape sensing applications may not encounter such high curvature. PDR resulting in a 10 picometer polarization-dependence of Bragg wavelength is routinely observable, corresponding to >$10^{-5}$ birefringence. Larger PDR should be obtainable with optimization. This might be achieved by optimized optical exposures during grating writing, or by the impression of differential radial stresses during exposure. Differential stress might be effected through transparent compression plates, or optically-induced, transient thermal gradients (non-contact, and best with pulsed exposures). Where handling effects can significantly reorient PDR, the effect can be computationally corrected in proportion to the independently determined local curvature.

Exemplary embodiments are directed to computer based systems for implementing the methods for measuring fiber twist described herein. Such a system can include a spherical array, an analog to digital computer, a front end signal processor, and a computer processor having software for accomplishing the front end signal processing and nearfield acoustical holography calculations, and a display device. The system can also include memory or storage for storing raw data, intermediate results, or final results for later processing, an output device for transmitting raw data, intermediate results, or final results to different computer or to another device, or a printer for printing the results. Communications devices can be wired or wireless.

Portions of the system operate in a computing operating environment, for example, a desktop computer, a laptop computer, a mobile computer, a server computer, and the like, in which embodiments of the invention may be practiced. A brief, general description of a suitable computing environment in which embodiments of the invention may be implemented is described as follows. While the invention will be described in the general context of program modules that execute in conjunction with program modules that run on an operating system on a personal computer, those skilled in the art will recognize that the invention may also be implemented in combination with other types of computer systems and program modules.

Generally, program modules include routines, programs, components, data structures, and other types of structures that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

An illustrative operating environment for embodiments of the invention will be described. A computer comprises a general purpose desktop, laptop, handheld, mobile or other type of computer (computing device) capable of executing one or more application programs. The computer includes at least one central processing unit ("CPU"), a system memory, including a random access memory ("RAM") and a read-only memory ("ROM"), and a system bus that couples the memory to the CPU. A basic input/output system containing the basic routines that help to transfer information between elements within the computer, such as during startup, is stored in the ROM. The computer further includes a mass storage device for storing an operating system, application programs, and other program modules.

The mass storage device is connected to the CPU through a mass storage controller connected to the bus. The mass storage device and its associated computer-readable media provide non-volatile storage for the computer. Although the description of computer-readable media contained herein refers to a mass storage device, such as a hard disk or CD-ROM drive, it should be appreciated by those skilled in the art that computer-readable media can be any available tangible physical media that can be accessed or utilized by the computer.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, digital versatile disks ("DVD"), or other optical storage, magnetic cassettes, magnetic tape, and magnetic disk storage or other magnetic storage devices.

According to various embodiments of the invention, the computer may operate in a networked environment using logical connections to remote computers through a network, such as a local network, the Internet, etc. for example. The computer may connect to the network through a network interface unit connected to the bus. It should be appreciated that the network interface unit may also be utilized to connect to other types of networks and remote computing systems. The computer may also include an input/output controller for receiving and processing input from a number of other devices, including a keyboard, mouse, or other device. Similarly, an input/output controller may provide output to a display screen, a printer, or other type of output device.

As mentioned briefly above, a number of program modules and data files may be stored in the mass storage device and RAM of the computer, including an operating system suitable for controlling the operation of a networked personal computer. The mass storage device and RAM may also store one or more program modules. In particular, the mass storage device and the RAM may store application programs, such as a software application, for example, a word processing application, a spreadsheet application, a slide presentation application, a database application, etc.

It should be appreciated that various embodiments of the present invention may be implemented as a sequence of computer implemented acts or program modules running on a computing system and/or as interconnected machine logic circuits or circuit modules within the computing system. The implementation is a matter of choice dependent on the performance requirements of the computing system implementing the invention. Accordingly, logical operations including related algorithms can be referred to variously as operations, structural devices, acts or modules. It will be recognized by one skilled in the art that these operations, structural devices, acts and modules may be implemented in software, firmware, special purpose digital logic, and any combination thereof without deviating from the spirit and scope of the present invention as described herein.

Because numerous modifications and variations of the above-described invention will occur to those of ordinary skill in the art, it is not desired to limit the invention to the exact construction and operation illustrated and described. Accordingly, all suitable modifications and equivalents may be resorted to, falling within the scope of the invention.

What is claimed as new and desired to be protected by Letters Patent of the United States is:

1. An apparatus comprising:
a polarization controller operable to adjust polarization of launched light;
a multi-core optical fiber comprising a center core and a plurality of peripheral cores at a distance radially from said center core and running parallel to said center core, said center core comprising at least one fiber Bragg grating (FBG) with polarization-dependent reflectivity, said FBG at a specified distance from the launch end of the fiber, said multi-core optical fiber being operably located to receive the launched light, said fiber Bragg grating reflecting the launched light as reflected light;
a multi-core optical fiber bend sensing system operable to communicate with said multi-core optical fiber, said multi-core optical fiber bend sensing system being operable to measure curvature in said multi-core optical fiber;
a processor operable to communicate with said polarization controller;
a single core optical fiber;
an optical fiber coupler;
a light source communicating with said single core optical fiber and operable to transmit said launched light through said single core optical fiber thence through said optical fiber coupler and into said multi-core optical fiber;
a spectrometer communicating with said single core optical fiber and said processor;
a beam splitter with fiber-coupling optics communicating with said single core optical fiber, said polarization vector analyzer, and said multi-core optical fiber; and
one of a switch and a fan-out operably communicating with said beam splitter and said multi-core optical fiber, and
a polarization vector analyzer operable to communicate with said single-core optical fiber and said processor, said polarization vector analyzer being operable to measure the polarization state of said launched light,
wherein said FBG exhibits a minor axis and a major axis of birefringence, said polarization controller being operable to vary the polarization of the launched light so that light arriving at the FBG is linearly polarized and aligned with one of the minor axis and the major axis of birefringence,
wherein said processor is operable, after said polarization controller adjusts the polarization of the launched light, to determine a twist in said multi-core optical fiber based on the polarization of the launched light and the bend in said multi-core optical fiber, and the specified distance from the launch end of the fiber to the FBG.

2. The apparatus according to claim 1, wherein said polarization controller comprises one of an electro-optical polarization controller, a bulk-optic polarization controller, and an electro-mechanical polarization controller, said electro-mechanical polarization controller comprising a plurality of fiber squeezers.

3. The apparatus according to claim 1, wherein said at least one fiber Bragg grating comprises a plurality of fiber Bragg gratings.

4. The apparatus according to claim 1, wherein said multi-core optical fiber bend sensing system is operable to determine the bend from strain sensed in said plurality of peripheral cores.

5. The apparatus according to claim 1, wherein said light source comprises one of a tunable narrowband light source and a broadband light source communicating with a tunable narrowband filter.

6. An apparatus comprising:
a polarization controller operable to adjust polarization of launched light;
a multi-core optical fiber comprising a center core and a plurality of peripheral cores at a distance radially from said center core and running parallel to said center core, said center core comprising at least one fiber Bragg grating (FBG) with polarization-dependent reflectivity, said FBG at a specified distance from the launch end of the fiber, said multi-core optical fiber being operably located to receive the launched light, said fiber Bragg grating reflecting the launched light as reflected light;

a multi-core optical fiber bend sensing system operable to communicate with said multi-core optical fiber, said multi-core optical fiber bend sensing system being operable to measure curvature in said multi-core optical fiber;

a processor operable to communicate with said polarization controller;

a polarization vector analyzer operable to communicate with said single-core optical fiber and said processor, said polarization vector analyzer being operable to measure the polarization state of said launched light, a polarization-maintaining single-mode and single core optical fiber communicating with said polarization controller;

a narrowband light source comprising a narrowband light source wavelength;

a broadband light source;

a first polarization-maintaining coupler communicating with said polarization-maintaining single-mode optical fiber;

a second polarization-maintaining coupler communicating with said polarization-maintaining single-mode optical fiber;

a first linear polarizer communicating with said narrowband light source and said first polarization-maintaining coupler;

a second linear polarizer communicating with said broadband light source and said second polarization-maintaining coupler;

a spectrometer communicating with said single core optical fiber through said second polarization maintaining coupler and said processor;

a beam splitter with fiber-coupling optics communicating with said polarization-maintaining single core optical fiber, said polarization vector analyzer, and said multi-core optical fiber;

one of a switch and a fan-out operably communicating with said beam splitter and said multi-core optical fiber, and a narrowband filter communicating with said beam splitter and said polarization vector analyzer, said narrowband filter having a pass band wavelength coincident with the narrowband light source wavelength, said pass band wavelength being distinct from any Bragg wavelength of said FBG, wherein said FBG exhibits a minor axis and a major axis of birefringence, said polarization controller being operable to vary the polarization of the launched light so that light arriving at the FBG is linearly polarized and aligned with one of the minor axis and the major axis of birefringence, wherein said processor is operable, after said polarization controller adjusts the polarization of the launched light, to determine a twist in said multi-core optical fiber based on the polarization of the launched light and the bend in said multi-core optical fiber, and the specified distance from the launch end of the fiber to the FBG.

7. The apparatus according to claim 6, wherein said narrowband light source comprises a laser diode.

8. The apparatus according to claim 6, wherein said at least one fiber Bragg grating comprises a plurality of fiber Bragg gratings.

9. The apparatus according to claim 6, wherein said multi-core optical fiber bend sensing system is operable to determine the bend from strain sensed in said plurality of peripheral cores.

* * * * *